(12) United States Patent
Steen et al.

(10) Patent No.: US 10,746,222 B2
(45) Date of Patent: Aug. 18, 2020

(54) SYSTEM AND METHOD FOR A VARIABLE SQUEEZE FILM DAMPER

(71) Applicant: General Electric Company, Schenectady, NY (US)

(72) Inventors: Tod Robert Steen, West Chester, OH (US); Charles Stanley Orkiszewski, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 993 days.

(21) Appl. No.: 15/135,908

(22) Filed: Apr. 22, 2016

(65) Prior Publication Data
US 2017/0307046 A1    Oct. 26, 2017

(51) Int. Cl.
*F16C 27/04*     (2006.01)
*F01D 25/16*    (2006.01)

(52) U.S. Cl.
CPC .......... *F16C 27/045* (2013.01); *F01D 25/164* (2013.01); *F16C 2360/23* (2013.01)

(58) Field of Classification Search
CPC ................ F16C 27/045; F16C 32/0677; F16C 2360/23; F16F 15/0237; F01D 25/04; F01D 25/16; F01D 25/164
USPC ......................................................... 384/99
See application file for complete search history.

(56) References Cited

U.S. PATENT DOCUMENTS

| 2,602,009 | A |   | 7/1952  | Barlow et al. |
| 4,527,910 | A |   | 7/1985  | Fleming |
| 4,867,655 | A |   | 9/1989  | Barbic et al. |
| 4,947,639 | A | * | 8/1990  | Hibner ................ F01D 25/164 384/535 |
| 5,099,966 | A | * | 3/1992  | Wohrl ....................... F16F 9/52 188/276 |
| 5,169,241 | A |   | 12/1992 | Singh |
| 5,178,400 | A |   | 1/1993  | Singh |
| 5,320,134 | A |   | 6/1994  | Singh |
| 5,344,239 | A |   | 9/1994  | Stallone et al. |

(Continued)

FOREIGN PATENT DOCUMENTS

| DE | 10 2006 026 123 B3 | 1/2008 |
| GB | 2 111 136 A | 6/1983 |

(Continued)

OTHER PUBLICATIONS

Extended European Search Report and Opinion issued in connection with corresponding EP Application No. 17164944.5 dated Sep. 13, 2017.

(Continued)

*Primary Examiner* — James Pilkington
(74) *Attorney, Agent, or Firm* — General Electric Company; James L. Reed (57) ABSTRACT

A damper assembly includes a bearing assembly including a radially outer surface. A housing surrounds the bearing assembly and includes a radially inner surface facing the radially outer surface. The radially outer and inner surfaces define a plurality of annuli therebetween. The damper assembly further includes a plurality of fluid supplies coupled in flow communication with the plurality of annuli and configured to deliver a fluid to each annulus of the plurality of annuli. Each fluid supply of the plurality of fluid supplies independently controls the fluid within the respective annulus.

18 Claims, 6 Drawing Sheets

(56) References Cited

U.S. PATENT DOCUMENTS

| | | |
|---|---|---|
| 5,711,615 A | 1/1998 | Stitz et al. |
| 7,267,196 B2 | 9/2007 | Mathur |
| 7,329,048 B2 | 2/2008 | Klusman et al. |
| 7,517,152 B1 | 4/2009 | Walsh |
| 7,798,720 B1 | 9/2010 | Walsh |
| 8,834,095 B2 | 9/2014 | Davis |
| 2009/0015085 A1 | 1/2009 | Nakajima |
| 2009/0269185 A1 | 10/2009 | Spencer et al. |

FOREIGN PATENT DOCUMENTS

| | | |
|---|---|---|
| JP | H05-19641 U | 3/1993 |
| JP | 2003-139134 A | 5/2003 |
| WO | 2013/183519 A1 | 12/2013 |

OTHER PUBLICATIONS

Machine Translation and Notification of Reasons for Refusal issued in connection with corresponding JP Application No. 2017-078569 dated Mar. 13, 2018.

\* cited by examiner

SYSTEM AND METHOD FOR A VARIABLE SQUEEZE FILM DAMPER

BACKGROUND

The field of the disclosure relates generally to gas turbine engines and, more particularly, to a variable squeeze film damper system within gas turbine engines.

Gas turbine engines typically include squeeze film dampers that provide damping to rotating components, such as a rotor shaft, to reduce and control vibration. At least some known squeeze film dampers include a bearing support member, such as an outer race of a rolling element bearing supported shaft, fitted within an annular housing chamber that restricts radial motion of the bearing support member. An annular film space is defined between an outer surface of the outer race and an opposite inner surface of the bearing housing such that damper oil can be introduced therein. Vibratory and/or radial motion of the shaft and its bearing generate hydrodynamic forces in the damper oil within the annular film space for damping purposes.

In known squeeze film damper systems, damping is generally consistent during engine start conditions and during engine cruising operating conditions. However, gas turbine engines typically require a greater amount of damping during engine start conditions, such as during bowed rotor starts, rather than during normal gas turbine engine cruising conditions when excess damping can decrease engine efficiency.

BRIEF DESCRIPTION

In one aspect, a damper assembly is provided. The damper assembly includes a bearing assembly including a radially outer surface. A housing surrounds the bearing assembly and includes a radially inner surface facing the radially outer surface. The radially outer and inner surfaces define a plurality of annuli therebetween. The damper assembly further includes a plurality of fluid supplies coupled in flow communication with the plurality of annuli and configured to deliver a fluid to each annulus of the plurality of annuli. Each fluid supply of the plurality of fluid supplies independently controls the fluid within the respective annulus.

In another aspect, a damper assembly is provided. The damper assembly includes a circumferential bearing assembly including a radially outer surface. A housing includes a radially inner surface at least partially surrounding the bearing assembly. A notch defined within at least one of the radially outer surface and the radially inner surface and extending axially therefrom. The notch and the radially outer and inner surfaces define an annulus therebetween. A damper seal coupled to at least one of the bearing assembly and the housing and disposed within the respective notch. The damper seal configured to be radially positionable within the notch therein defining a volume of the annulus. The damper assembly further includes a fluid supply coupled in flow communication with the annulus and configured to deliver a fluid to the annulus.

In yet another aspect, a method of damping a turbofan engine is provided. The turbofan engine includes a rotatable shaft coupled to a damper assembly. The damper assembly includes a bearing assembly including a radially outer surface. A housing surrounds the bearing assembly and includes a radially inner surface facing the radially outer surface. The radially outer and inner surfaces define a plurality of annuli therebetween. The damper assembly further includes a plurality of fluid supplies coupled in flow communication with the plurality of annuli. The method includes selectively channeling a first flow of fluid from a first fluid supply of the plurality of fluid supplies to a first annulus of the plurality of annuli. The method also includes selectively channeling a second flow of fluid from a second fluid supply of the plurality of fluid supplies to a second annulus of the plurality of annuli.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of a variable squeeze film damper as described herein provide a controllable damper that can be adjusted to provide different levels of damping and facilitate improving engine performance. Specifically, the damping assemblies and methods described herein allow for damping to be increased or decreased depending on the operational mode of the engine. The damping assembly includes a plurality of annuli defined between an inner housing surface and an outer bearing surface that receives a pressurized damping fluid. A plurality of fluid supplies coupled in flow communication with the plurality of annuli independently control pressurized fluid therein. During engine operation that requires an increased amount of damping, two or more fluid supplies pressurize the fluid within each respective annulus. During engine operation that requires a decreased amount of damping, only one fluid supply pressurizes the fluid within the respective annulus or none of the fluid supplies pressurize the respective fluid. In an alternative embodiment, the damping assembly includes a single annulus with a movable piston disposed therein such that the annulus's volume is controlled. Reducing the annulus's volume increases damping within the damping assembly and increasing the annulus's volume decreases damping within the damping assembly. Adjusting damping to the current engine operating condition increases engine performance, for example, increasing damping during engine start conditions allows for shorter air motoring times and decreasing damping during high engine speed increases engine horse power.

Figure 1:
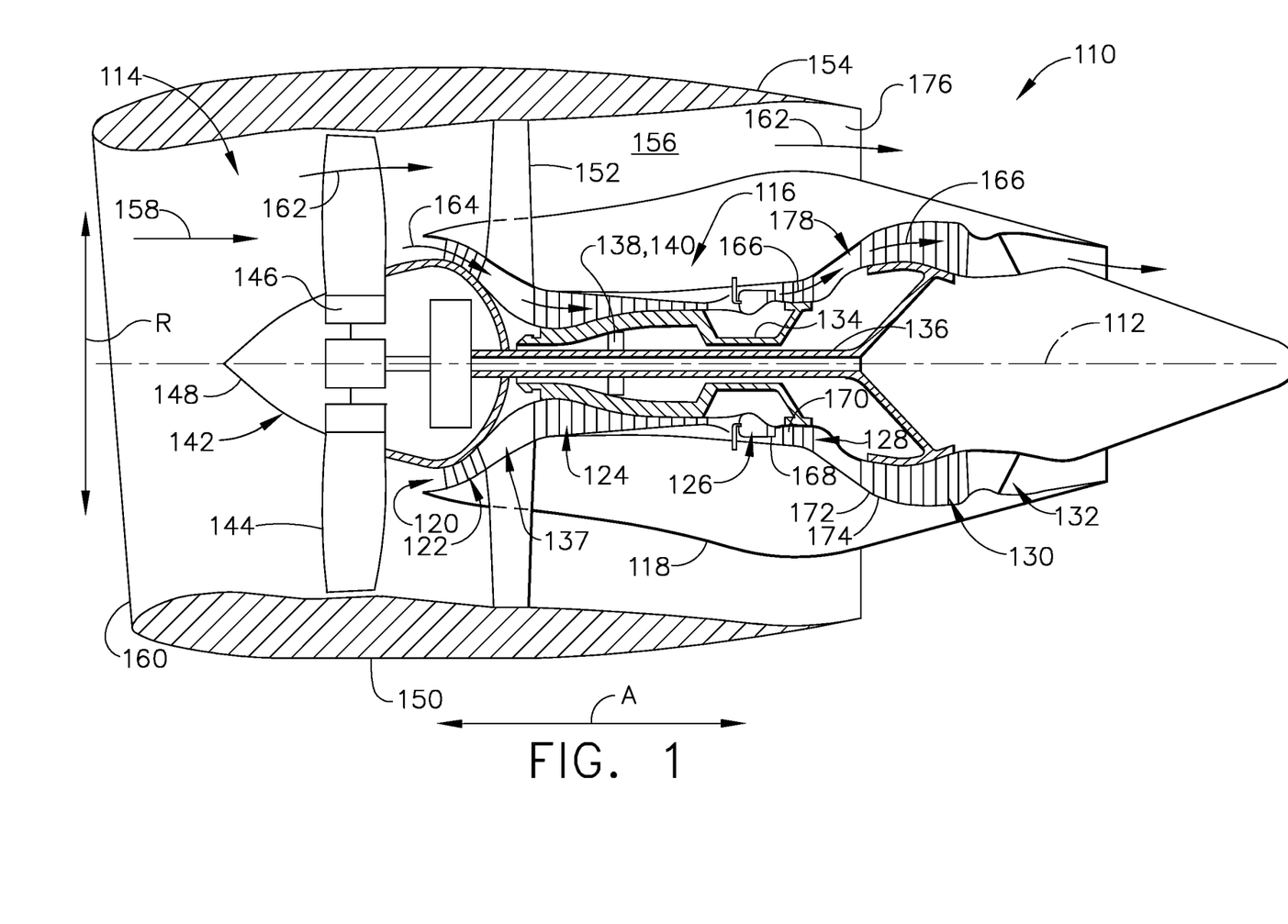
FIG. 1 is a schematic illustration of an exemplary gas turbine engine in accordance with an example embodiment of the present disclosure.

FIG. 1 is a schematic cross-sectional view of a gas turbine engine in accordance with an exemplary embodiment of the present disclosure. In the exemplary embodiment, the gas turbine engine is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R (extending perpendicular to longitudinal centerline 112). In general, turbofan engine 110 includes a fan case assembly 114 and a core gas turbine engine 116 disposed downstream from fan case assembly 114.

Core gas turbine engine 116 includes a substantially tubular outer casing 118 that defines an annular inlet 120. Outer casing 118 encases, in a serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. Each shaft 134 and 136 is supported by a plurality of bearing assemblies 138 having a damping system 140. The compressor section, combustion section 126, turbine section, and exhaust nozzle section 132 together define a core air flow path 137.

In the exemplary embodiment, fan case assembly 114 includes a fan 142 having a plurality of fan blades 144 coupled to a disk 146 in a spaced apart manner. As depicted, fan blades 144 extend outwardly from disk 146 generally along radial direction R. Fan blades 144 and disk 146 are together rotatable about longitudinal centerline 112 by LP shaft 136.

Referring still to the exemplary embodiment of FIG. 1, disk 146 is covered by rotatable front hub 148 aerodynamically contoured to promote an airflow through plurality of fan blades 144. Additionally, exemplary fan case assembly 114 includes an annular fan casing or outer nacelle 150 that circumferentially surrounds fan 142 and/or at least a portion of core gas turbine engine 116. It should be appreciated that nacelle 150 may be configured to be supported relative to core gas turbine engine 116 by an outlet guide vane assembly 152. Moreover, a downstream section 154 of nacelle 150 may extend over an outer portion of core gas turbine engine 116 so as to define a bypass airflow passage 156 therebetween.

During operation of turbofan engine 110, a volume of air 158 enters turbofan 110 through an associated inlet 160 of nacelle 150 and/or fan case assembly 114. As air 158 passes across fan blades 144, a first portion of air 158 as indicated by arrows 162 is directed or routed into bypass airflow passage 156 and a second portion of air 158 as indicated by arrows 164 is directed or routed into core air flow path 137, or more specifically into booster compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of booster compressor 122 and/or rotation of fan 138. Combustion gases 166 are subsequently routed through jet exhaust nozzle section 132 of core gas turbine engine 116 to provide propulsive thrust. Simultaneously, the pressure of first portion of air 162 is substantially increased as first portion of air 162 is routed through bypass airflow passage 156, including through outlet guide vane assembly 152 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core gas turbine engine 116.

In operation, each shaft 134 and/or 136 generally rotates about centerline 112. However, during some operating conditions, such as, but not limited to, a bowed rotor start and/or imbalanced load, shaft 134 and/or 136 undergoes an eccentric or orbiting motion which induces vibration and deflection that may propagate or transfer to other turbofan engine 110 locations. In the exemplary embodiment, damping system 140 is provided at the bearing positions of shafts 134 and/or 136 to reduce vibration and deflection loads within turbofan engine 110 caused by the rotating shafts 134 and/or 136. In alternative embodiments, damping system 140 may be positioned at any location along rotating shafts 134 and/or 136

It should be appreciated, however, that exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, core engine, auxiliary power unit, and test rig.

Figure 2:
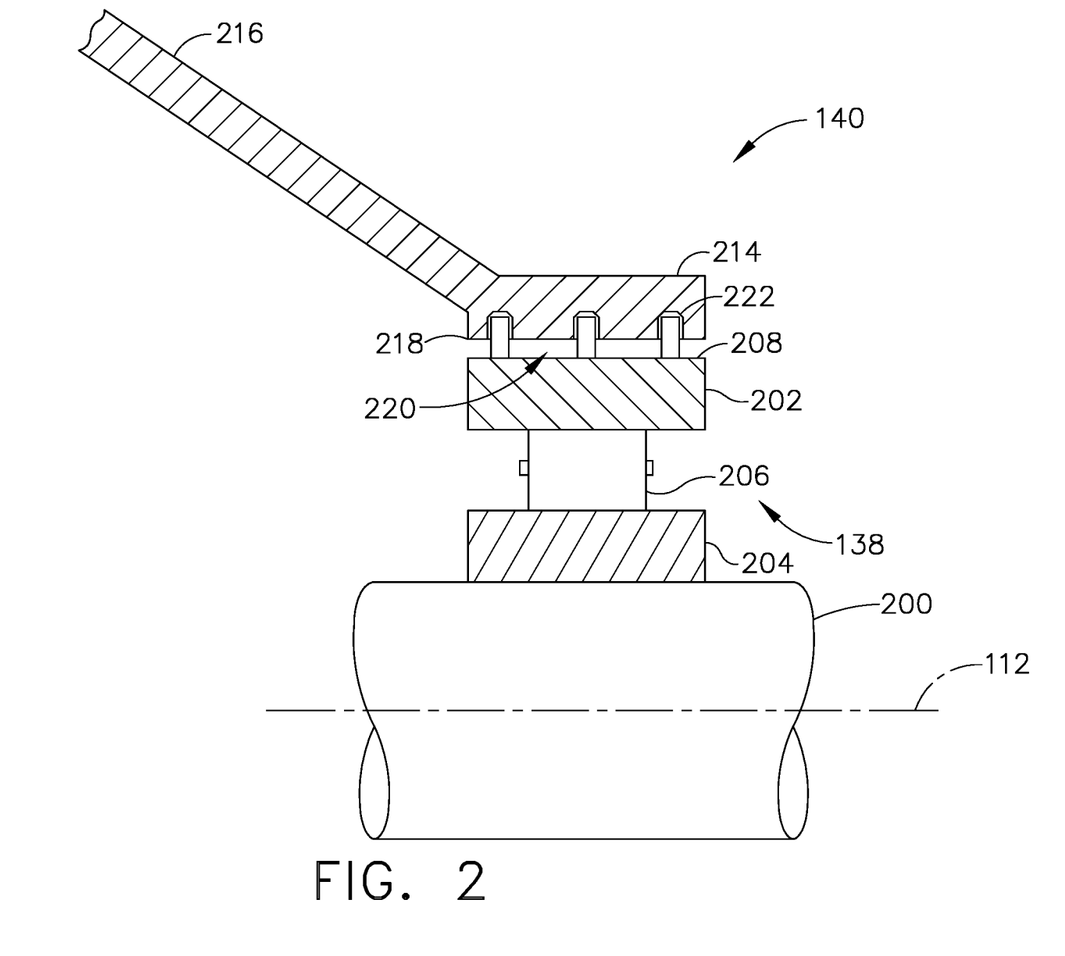
FIG. 2 is a cross-sectional view of an exemplary damping system from the turbofan engine shown in FIG. 1.
Figure 3:
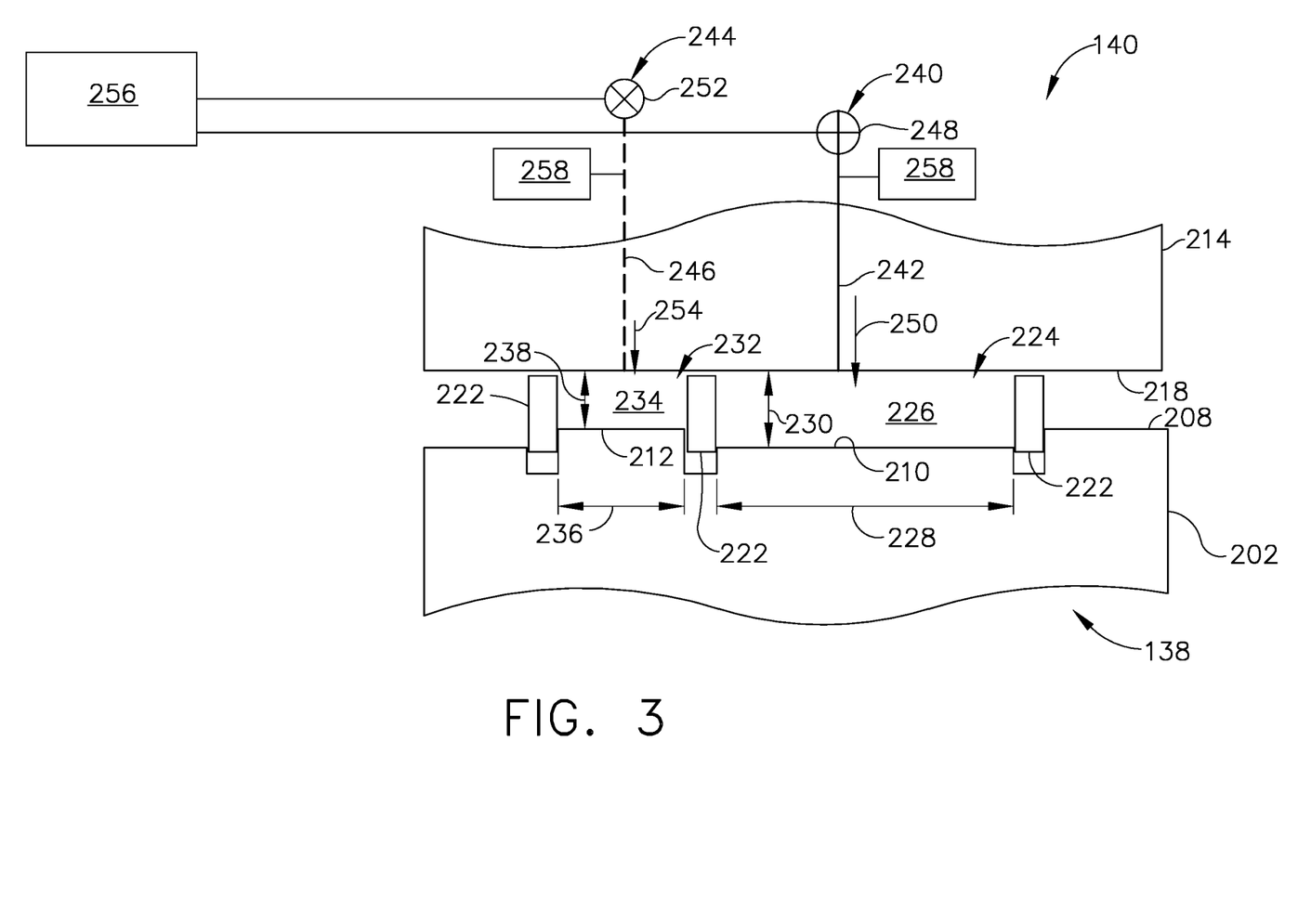
FIG. 3 is a schematic view of the damping system shown in FIG. 2.

FIG. 2 is a cross-sectional view of damping system 140 from turbofan engine 110 (shown in FIG. 1). FIG. 3 is a schematic view of damping system 140 shown in FIG. 2. In the exemplary embodiment, damping system 140 is a squeeze film damper. As shown in FIGS. 2 and 3, a shaft 200, such as HP shaft 134 or LP shaft 136, is rotatably supported by bearing assembly 138. Specifically, bearing assembly 138 is illustrated as a conventional roller bearing that includes an outer race 202, an inner race 204, and a plurality of roller elements 206 therebetween. Outer race 202 circumferentially surrounds shaft 200 and includes a radially outer surface 208. Radially outer surface 208 includes a plurality of surface sections 210 and 212 as illustrated in FIG. 3. Shaft 200 is circumferentially rotatably supported by inner race 204. In alternative embodiments, bearing assembly 138 is any other bearing that enables damping system 140 to function as described herein.

Damping system 140 includes a housing 214 circumferentially surrounding bearing assembly 138. Specifically, housing 214 extends from a static frame structure 216 such that housing 214 is non-rotating. Housing 214 includes a radially inner surface 218 facing outer race surface 208. Inner housing surface 218 and outer race surface 208 define a plurality of annuli 220 separated by seal rings 222 and contain a semi-pressurized incompressible damping fluid, such as oil or any other suitable damping medium. In the exemplary embodiment, a first annulus 224 is defined by inner housing surface 218 and first surface section 210 between seal rings 222. First annulus 224 has a volume 226 defined by a length 228 of first surface section 210 and a distance 230 from inner housing surface 218 to first surface section 210. Further, a second annulus 232 is defined by inner housing surface 218 and second surface section 212 between seal rings 222. Second annulus 232 has a volume 234 defined by a length 236 of second surface section 212 and a distance 238 from inner housing surface 218 to second surface section 212.

In the exemplary embodiment, first annulus volume 226 is substantially not equal to second annulus volume 234. That is, length 228 is substantially not equal to length 236 and distance 230 is substantially not equal to distance 238. In alternative embodiments, first and second annulus volumes 226 and 234 have any other dimensions that enable damping system 140 to function as described herein.

Damping system 140 further includes a first fluid supply 240 coupled in flow communication with first annulus 224 via an inlet 242 within housing 214 and a second fluid supply 244 coupled in flow communication with second annulus 232 via an inlet 246. Pressure shutoff valve 248 controls the pressure of a first fluid 250 from first fluid supply 240 within first annulus 224 and pressure shutoff valve 252 controls the pressure of a second fluid 254 from second fluid supply 244 within second annulus 232. In the exemplary embodiment, valves 248 and 252 are on/off valves, however, modulating valves may also be used. In alternative embodiments, the pressure of first and second fluids 250 and 254 are controlled by a controller 256 operably coupled to first and second fluid supplies 240 and 244.

In operation, outer race 202 of bearing assembly 138 is restricted from rotating relative to housing 214, such that rotation is limited to inner race 204 and shaft 200, though the entire bearing assembly 138 and its shaft 200 are free to move radially and orbitally within housing 214 in response to vibrations and dynamic loads within shaft 200. During shaft 200 loading, fluids 250 and 254 are pressurized, as bearing assembly 138 and shaft 200 are radially displaced, and fluids 250 and 254 are free to move within annuli 224 and 234 providing damping to engine 110.

In the exemplary embodiment, each fluid supply 240 and 244 is independently operated. For example, during a first phase of engine 110 operation, such as during rotor start conditions when engine 110 operates at lower revolutions per minute (RPM) and shaft 200 induces large loads, both fluid supplies 240 and 244 are operated together increasing damping. Respective fluids 250 and 254 within each annulus 224 and 232 are pressurized via valves 248 and 252 and/or controller 256 thereby creating an oil film and damping the load within shaft 200. Then, during a second phase of engine 110 operation, such as during cruising speed when engine 110 operates at higher RPM's, only first fluid supply 240 is operated while second fluid supply 244 is turned off. Only, first fluid 250 within first annulus 224 is pressurized thereby decreasing damping. The loads induced by shaft 200 are generally lower during high RPM operation thereby requiring less damping and improving engine performance. In alternative embodiments, both first and second fluid supplies 240 and 244 may be turned off such that no damping is provided.

In another example, each fluid supply 240 and 244 is independently operated based on fluid 250 and 254 temperatures measured by a thermocouple 258. Specifically, oil fluid with a lower temperature has a higher viscosity that leads to more damping than oil fluid with a higher temperature. For example, at engine start conditions under lower temperature operating conditions first fluid 250 has a temperature that increases damping and thus only first fluid supply 240 is operated. During cruising engine speed when first fluid supply 240 is operating at a higher temperature, first fluid supply 240 may be turned off and only second fluid supply 244 is operated, or both fluid supplies 240 and 244 may be shut off if damping is not needed. In alternative embodiments, damping system 140 may be controlled via any other parameters that enable damping system 140 to function as described herein.

The amount of damping for each fluid supply 240 and 244 within damping system 140 is controllable by proportioning each volume 226 and 234 respectively. For example, length 228 and/or length 236 can be increased or decreased. Furthermore, damping is further controllable by adjusting the pressurization of each fluid 250 and 254. In the exemplary embodiment, fluids 250 and 254 are substantially equal mediums. In alternative embodiments, fluids 250 and 254 are substantially non-equal mediums, for example, first fluid 250 is oil with a weight that is substantially non-equal to the oil weight of second fluid 254.

FIGS. 2 and 3 illustrate damping system 140 with two annuli 224 and 232, thereby, either both fluid supplies 240 and 244 are in operation, only one fluid supply 240 or 244 is in operation, or neither fluid supply 240 and 244 are in operation. In alternative embodiments, damping system 140 can have any number of annuli/fluid supplies to be able to control damping, such as and without limitation, 4, 6, or 10.

Figure 4:
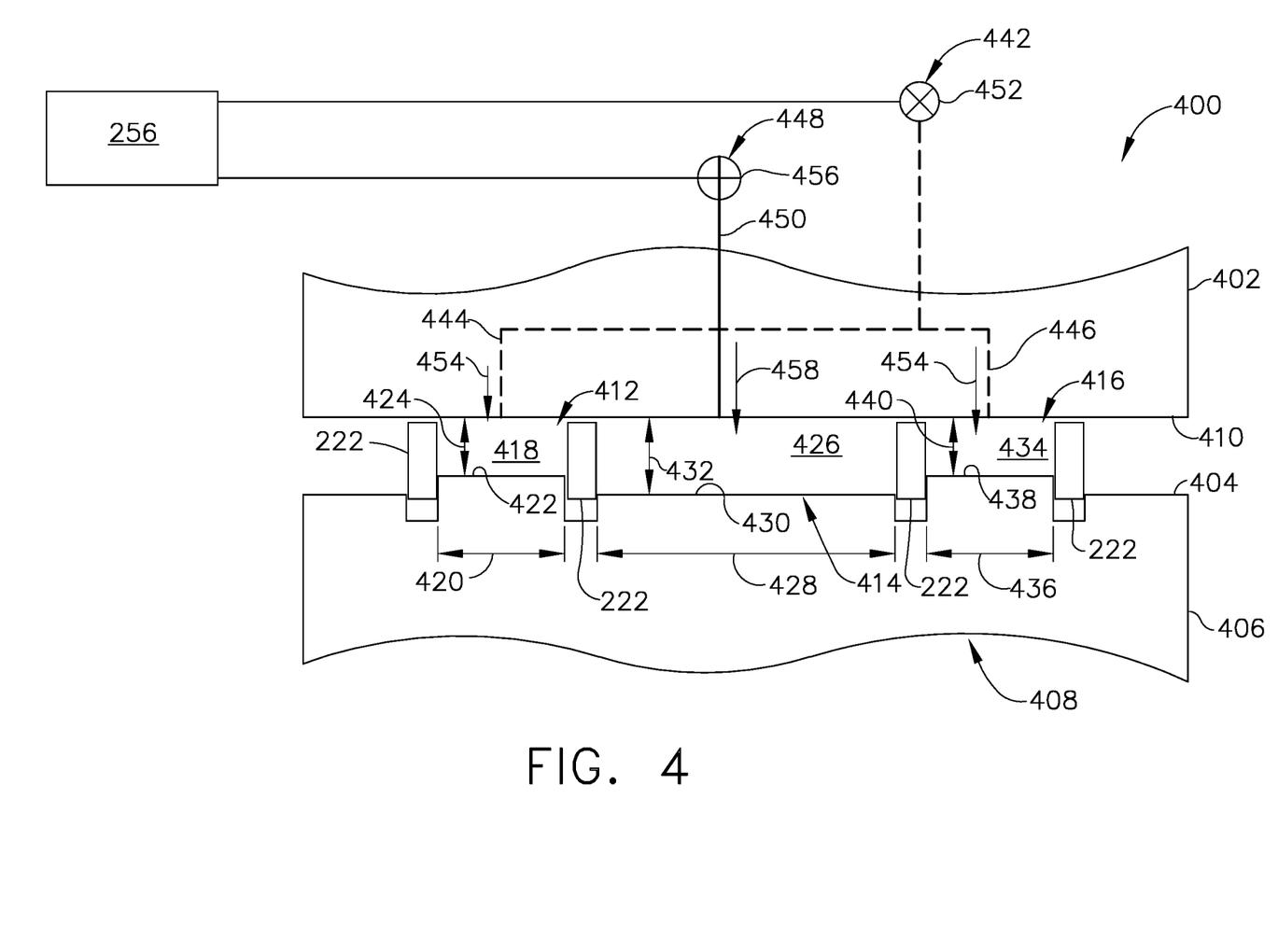
FIG. 4 is a schematic view of another exemplary damping system that may be used with the turbofan engine shown in FIG. 1.

FIG. 4 is a schematic view of another exemplary damping system 400 that may be used with turbofan engine 110 (shown in FIG. 1). In this exemplary embodiment, damping system 400 includes a housing 402 that circumferentially surrounds radially outer surface 404 of outer race 406 of bearing assembly 408. Housing 402 includes a radially inner surface 410 opposite outer race surface 404. Inner housing surface 410 and outer race surface 404 define a plurality of annuli 412, 414, and 416 separated by seal rings 222 and contain damping fluid. A first annulus 412 has a volume 418 defined by a length 420 of a first surface section 422 and a distance 424 from inner housing surface 410 to first surface section 422. A second annulus 414 has a volume 426 defined by a length 428 of a second surface section 430 and a distance 432 from inner housing surface 410 to second surface section 430. A third annulus 416 has a volume 434 defined by a length 436 of a third surface section 438 and a distance 440 from inner housing surface 410 to third surface section 438.

In this exemplary embodiment, first annulus volume 418 is substantially equal to third annulus volume 434. That is, length 420 is substantially equal to length 436 and distance 424 is substantially equal to distance 440. Second annulus volume 426 is substantially not equal to either first annulus volume 418 or third annulus volume 434. That is, length 428 is substantially not equal to either length 420 or length 436 and distance 432 is substantially not equal to either distance 424 or distance 440.

Damping system 400 further includes a first fluid supply 442 coupled in flow communication with first annulus 412 and third annulus 416 via inlets 444 and 446 within housing 402. A second fluid supply 448 is coupled in flow communication with second annulus 414 via an inlet 450. Pressure shutoff valve 452 controls the pressure of a first fluid 454 from fluid supply 442 within first annulus 412 and third annulus 416. Pressure shutoff valve 456 controls the pressures of a second fluid 458 from second fluid supply 448 within second annulus 414. In alternative embodiments, the pressure of first and second fluids 454 and 458 are controlled by controller 256 operably coupled to first and second fluid supplies 442 and 448.

In this exemplary embodiment, each fluid supply 442 and 448 is independently operated. First fluid 454 is pressurized within both first and third annuli 412 and 416 from first fluid supply 442 and second fluid 458 is pressurized within second annuli 414 from second fluid supply 448 to dampen rotor shaft 200 (shown in FIG. 2). During turbofan engine 110 operation, both fluid supplies 442 and 448 are pressurized for increased damping at a low engine RPM and only one fluid supply 442 or 448 is pressurized for decreased damping at a high engine RPM.

Figure 5:
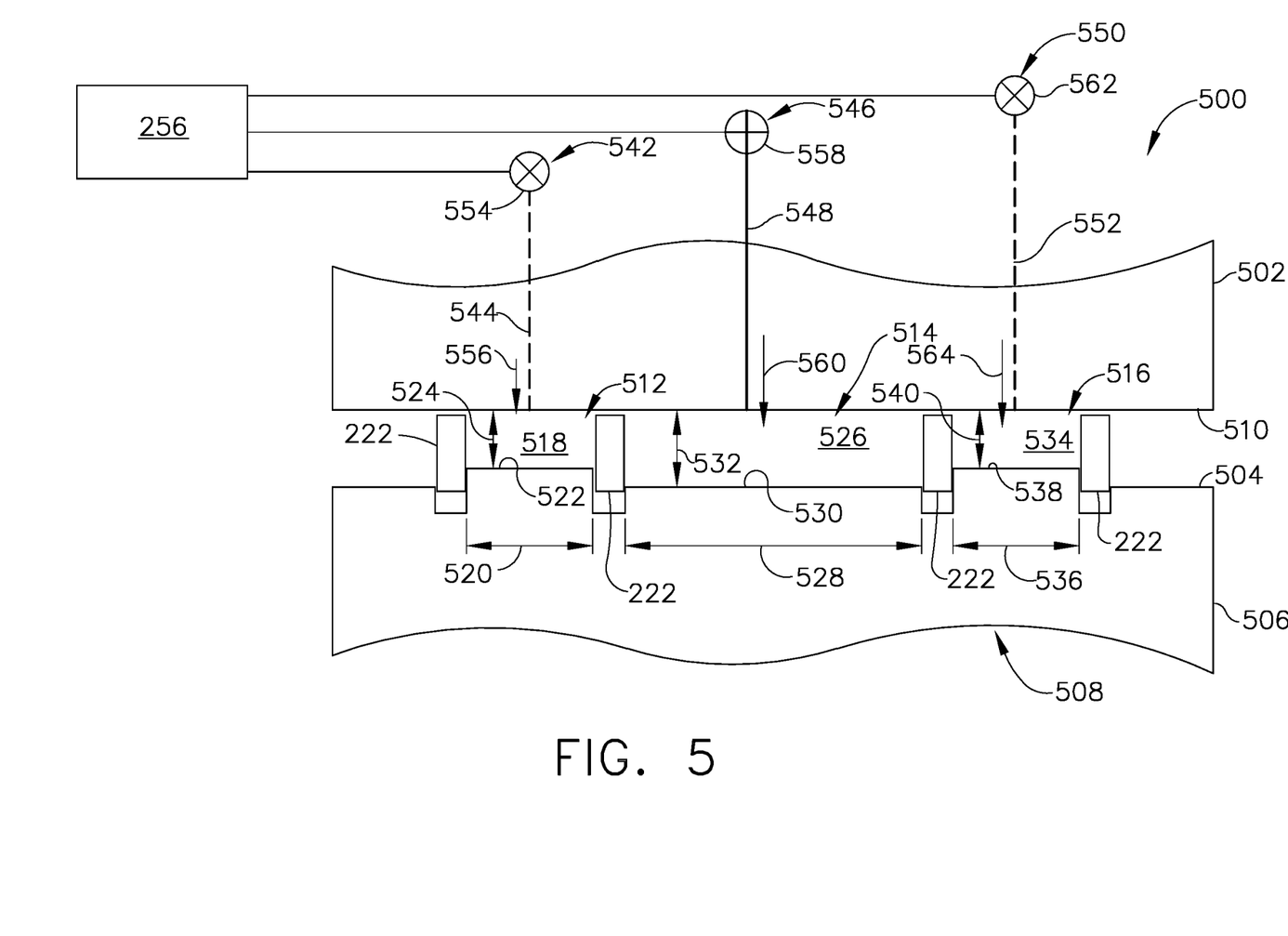
FIG. 5 is a schematic view of a further exemplary damping system that may be used with the turbofan engine shown in FIG. 1.

FIG. 5 is a schematic view of a further exemplary damping system 500 that may be used with turbofan engine 110 (shown in FIG. 1). In this exemplary embodiment, damping system 500 includes a housing 502 that circumferentially surrounds radially outer surface 504 of outer race 506 of bearing assembly 508. Housing 502 includes a radially inner surface 510 opposite outer race surface 504. Inner housing surface 510 and outer race surface 504 define a plurality of annuli 512, 514, and 516 separated by seal rings 222 and contain damping fluid. A first annulus 512 has a volume 518 defined by a length 520 of a first surface section 522 and a distance 524 from inner housing surface 510 to first surface section 522. A second annulus 514 has a volume 526 defined by a length 528 of a second surface section 530 and a distance 532 from inner housing surface 510 to second surface section 530. A third annulus 516 has a volume 534 defined by a length 536 of a third surface section 538 and a distance 540 from inner housing surface 510 to third surface section 538.

In this exemplary embodiment, first annulus volume 518 is substantially not equal to second annulus volume 526 and second annulus volume 526 is substantially not equal to third annulus volume 534. That is, length 520 is substantially not equal to length 528 and length 528 is substantially not equal to length 536. Additionally, distance 512 is substantially not equal to distance 532 and distance 532 is substantially not equal to distance 540.

Damping system 500 further includes a first fluid supply 542 coupled in flow communication with first annulus 512 via an inlet 544 within housing 502. A second fluid supply 546 is coupled in flow communication with second annulus 514 via an inlet 548. A third fluid supply 550 is coupled in flow communication with third annulus 516 via an inlet 552. Pressure shutoff valve 554 controls the pressure of a first fluid 556 from first fluid supply 542 within first annulus 512. Pressure shutoff valve 558 controls the pressures of a second fluid 560 from second fluid supply 546 within second annulus 514. Pressure shutoff valve 562 controls the pressure of a third fluid 564 from third fluid supply 550 within third annulus 516. In alternative embodiments, the pressure of first, second, and third fluids 556, 560, and 564 are controlled by controller 256 operably coupled to each fluid supply 542, 546, and 550.

In this exemplary embodiment, each fluid supply 542, 546, and 550 is independently operated. First fluid 556 is pressurized within first annulus 512 from first fluid supply 542, second fluid 560 is pressurized within second annulus 514 from second fluid supply 546, and third fluid 564 is pressurized within third annulus 516 from third fluid supply 550 to dampen rotor shaft 200 (shown in FIG. 2). During turbofan engine 110 operation, all three fluid supplies 542, 546, and 550 are pressurized for increased damping at low engine RPM, while two fluid supplies, for example first and second supply 542 and 546, are pressurized for damping at a mid-engine RPM, and only one fluid supply, for example 546, is pressurized for decreased damping at a high engine RPM.

Figure 6:
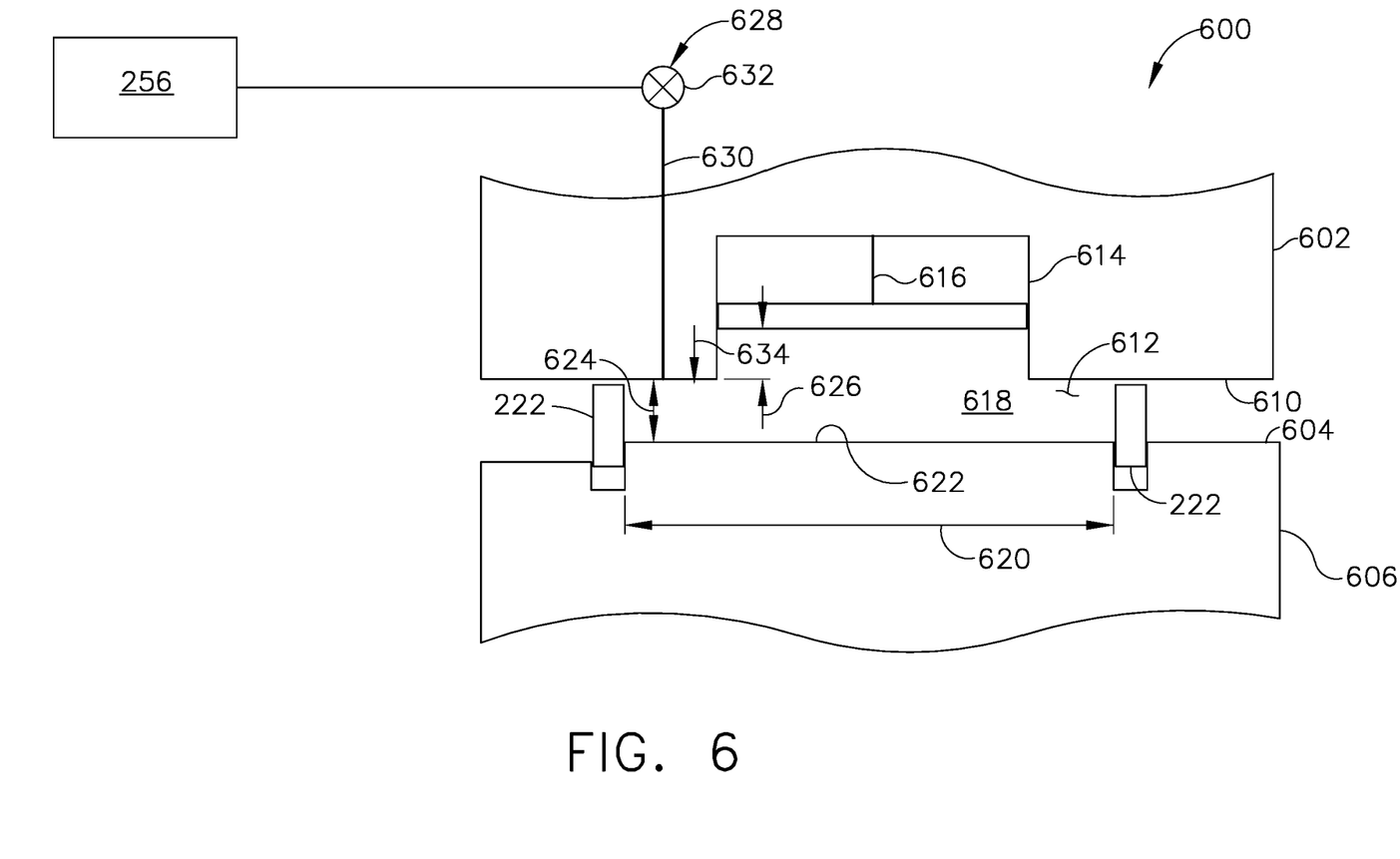
FIG. 6 is a schematic view of an additional exemplary damping system that may be used with the turbofan engine shown in FIG. 1.

FIG. 6 is a schematic view of an additional exemplary damping system 600 that may be used with turbofan engine 110 (shown in FIG. 1). In this exemplary embodiment, damping system 600 includes a housing 602 that circumferentially surrounds radially outer surface 604 of outer race 606 of bearing assembly 608. Housing 602 includes a radially inner surface 610 opposite outer race surface 604. Inner housing surface 610 and outer race surface 604 define an annulus 612 containing damping fluid. Inner housing surface 610 includes a rectangular notch 614 with a damper seal 616 disposed therein. In the exemplary embodiment, damper seal 616 is a piston that is radially movable within notch 614 thereby defining a volume 618 of annulus 612 that is variable. In alternative embodiments, damper seal 616 is any other seal that enables volume 618 to be defined as described herein, such as an expanding seal ring. Volume 618 is defined by a length 620 of a surface section 622 and a distance 624 from inner housing surface 610 to surface section 622. Furthermore, volume 618 may be expanded by moving damper seal 616 radially outward a distance 626 and extending annulus 612 within notch 614. In alternative embodiments, notch 614 may be disposed within outer bearing surface 604. Damping system 600 further includes a fluid supply 628 coupled in flow communication with annulus 612 via an inlet 630 within housing 602 and provides a fluid 634 to annulus 612. Pressure shutoff valve 632 controls the pressure of fluid 634 from fluid supply 628 within annulus 612. In alternative embodiments, the pressure of fluid is controlled by controller 256 operably coupled to fluid supply 628.

In this exemplary embodiment, damping is controlled by adjusting the annulus volume 618 to dampen rotor shaft 200 (shown in FIG. 2). Specifically, damping is increased when volume 618 is reduced and damping is decreased when volume 618 is increased. For example, during turbofan engine 110 operation, at low engine RPM volume 618 is decreased by damper seal 616 towards outer race surface 604 thereby increasing damping, while at a high engine RPM volume 618 is increased by moving damper seal 616 away from outer race surface 604 thereby decreasing damping.

The above-described embodiments of the variable squeeze film dampers provide a controllable damper that can be adjusted to provide different levels of damping and facilitate improving engine performance. Specifically, the damping assemblies and methods described herein allow for damping to be increased or decreased depending on the operational mode of the engine. The damping assembly includes a plurality of annuli defined between an inner housing surface and an outer bearing surface that receives a pressurized damping fluid. A plurality of fluid supplies coupled in flow communication with the plurality of annuli independently control pressurized fluid therein. During engine operation that requires an increased amount of damping, two or more fluid supplies pressurize the fluid within each respective annulus. During engine operation that requires a decreased amount of damping, only one fluid supply pressurizes the fluid within the respective annulus or none of the fluid supplies pressurize the respective fluid. In an alternative embodiment, the damping assembly includes a single annulus with a movable piston disposed therein such that the annulus's volume is controlled. Reducing the annulus's volume increases damping within the damping assembly and increasing the annulus's volume decreases damping within the damping assembly. Adjusting damping to the current engine operating condition increases engine performance, for example, increasing damping during engine start conditions allows for shorter air motoring times and decreasing damping during high engine speed increases engine horse power.

An exemplary technical effect of the methods, systems, and apparatus described herein includes at least one of: (a) increasing damping during predetermined engine operating conditions; (b) decreasing damping during other predetermined engine operating conditions; (c) increasing engine performance; (d) decreasing air motoring times during engine start conditions; and (e) increasing engine horse power during high engine speed conditions.

Exemplary embodiments of methods, systems, and apparatus for the variable squeeze film dampers are not limited to the specific embodiments described herein, but rather, components of the systems and/or steps of the methods may be utilized independently and separately from other components and/or steps described herein. For example, the methods may also be used in combination with other systems requiring damping assemblies, and the associated methods, and are not limited to practice with only the systems and methods as described herein. Rather, the exemplary embodiment can be implemented and utilized in connection with many other applications, equipment, and systems that may benefit from damping a rotatable shaft.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A damper assembly comprising:
a bearing assembly comprising a radial outer surface;
a housing surrounding said bearing assembly, said housing comprising a radial inner surface facing said radial outer surface, said radial outer and inner surfaces defining a plurality of annuli therebetween; and
a plurality of fluid supplies coupled in flow communication with said plurality of annuli and configured such that each fluid supply of said plurality of fluid supplies delivers a fluid to an annulus of said plurality of annuli, wherein each fluid supply of said plurality of fluid supplies independently controls the fluid within said respective annulus; and
a thermocouple configured to measure a temperature of the fluid, wherein each fluid supply of said plurality of fluid supplies controls the fluid within said respective annulus based on said temperature measurement.

2. The assembly of claim 1, wherein said plurality of annuli comprises a first annulus coupled in flow communication with a first fluid supply of said plurality of fluid supplies and a second annulus coupled in flow communication with a second fluid supply of said plurality of fluid supplies, wherein a volume of said first annulus is not equal to a volume of said second annulus.

3. The assembly of claim 1, wherein said plurality of annuli comprises a first annulus coupled in flow communication with a first fluid supply of said plurality of fluid supplies, a second annulus coupled in flow communication with a second fluid supply of said plurality of fluid supplies, and a third annulus coupled in flow communication with said first fluid supply, wherein a volume of said first annulus is equal to a volume of said third annulus and said volume of said first and third annuli is not equal to a volume of said second annulus.

4. The assembly of claim 1, wherein said plurality of annuli comprises a first annulus coupled in flow communication with a first fluid supply of said plurality of fluid supplies, a second annulus coupled in flow communication with a second fluid supply of said plurality of fluid supplies, and a third annulus coupled in flow communication with a third fluid supply of said plurality of fluid supplies, wherein a volume of said first annulus is not equal to a volume of said second annulus, a volume of said second annulus is not equal to a volume of said third annulus.

5. The assembly of claim 1, wherein each fluid supply of said plurality of fluid supplies comprises a shutoff valve configured to control the fluid within said respective annulus.

6. The assembly of claim 5, wherein said bearing assembly is coupled to a rotatable shaft, each said shutoff valve is operatively coupled to a controller, said controller configured to operate each said shutoff valve based on a rotational speed of the shaft.

7. The assembly of claim 1, wherein each fluid supply of said plurality of fluid supplies comprises a modulating valve operatively coupled to a controller, said controller configured to control the fluid within said respective annulus using said modulating valve.

8. A damper assembly comprising:
   a circumferential bearing assembly comprising a radial outer surface;
   a housing comprising a radial inner surface at least partially surrounding said bearing assembly;
   a notch defined within at least one of said radial outer surface and said radial inner surface and extending radially therefrom, said notch and said radial outer and inner surfaces defining an annulus therebetween;
   a piston disposed within said respective notch, said piston configured to be radially moveable within said notch therein defining a variable volume of said annulus, such that damping is increased when the variable volume is reduced and damping is decreased when the variable volume is increased; and
   a fluid supply coupled in flow communication with said annulus and configured to deliver a fluid to said annulus.

9. The assembly of claim 8, wherein said fluid supply comprises a shutoff valve configured to control the fluid within said annulus.

10. The assembly of claim 9, wherein said bearing assembly is coupled to a rotatable shaft, said shutoff valve is operatively coupled to a controller, said controller configured to operate said shutoff valve based on a rotational speed of the shaft.

11. The assembly of claim 8, wherein said fluid supply comprises a modulating valve operatively coupled to a controller, said controller configured to control the fluid within said annulus using said modulating valve.

12. The assembly of claim 8, further comprising a thermocouple configured to measure a temperature of the fluid, wherein said fluid supply controls the fluid within said annulus based on said temperature measurement.

13. A method of damping a turbofan engine, the turbofan engine including a rotatable shaft coupled to a damper assembly, the damper assembly including a bearing assembly including a radial outer surface, a housing at least partially surrounding the bearing assembly, the housing including a radial inner surface facing the radial outer surface, the radial outer and inner surfaces defining a plurality of annuli therebetween, a plurality of fluid supplies coupled in flow communication with the plurality of annuli such that each fluid supply of said plurality of fluid supplies delivers a fluid to an annulus of the plurality of annuli, said method comprising:
   selectively channeling a first flow of fluid from a first fluid supply of the plurality of fluid supplies to a first annulus of the plurality of annuli; and
   selectively channeling a second flow of fluid from a second fluid supply of the plurality of fluid supplies to a second annulus of the plurality of annuli;
   wherein at least one of selectively channeling the first flow of fluid from the first fluid supply and selectively channeling the second flow of fluid from the second fluid supply is determined by a temperature of the fluid.

14. The method of claim 13 further comprising selectively turning off the second fluid supply.

15. The method of claim 13, wherein at least one of selectively channeling the first flow of fluid from the first fluid supply and selectively channeling the second flow of fluid from the second fluid supply is determined using a rotational speed of the rotatable shaft.

16. The method of claim 13 further comprising selectively channeling a third flow of fluid from a third fluid supply of the plurality of fluid supplies to a third annulus of the plurality of annuli.

17. The method of claim 13, wherein selectively channeling the first flow of fluid from the first fluid supply further comprises selectively flowing fluid from the first fluid supply to a third annulus of the plurality of annuli.

18. The method of claim 13 wherein at least one of selectively channeling the first flow of fluid from the first fluid supply and selectively channeling the second flow of fluid from the second fluid supply is controlled through at least one of a shutoff valve and a modulating valve.

\* \* \* \* \*